(12) United States Patent
Sagawa et al.

(10) Patent No.: US 12,320,128 B2
(45) Date of Patent: *Jun. 3, 2025

(54) DECORATIVE SHEET, DECORATIVE MATERIAL INCLUDING THE SAME, AND METHOD FOR PRODUCING DECORATIVE SHEET

(71) Applicant: TOPPAN INC., Tokyo (JP)

(72) Inventors: Koichi Sagawa, Tokyo (JP); Takashi Tominaga, Tokyo (JP); Takahi Orihara, Tokyo (JP); Yusuke Taniguchi, Tokyo (JP)

(73) Assignee: TOPPAN INC., Tokyo (JP)

( * ) Notice: Subject to any disclaimer, the term of this patent is extended or adjusted under 35 U.S.C. 154(b) by 200 days.

This patent is subject to a terminal disclaimer.

(21) Appl. No.: 18/104,454

(22) Filed: Feb. 1, 2023

(65) Prior Publication Data

US 2023/0175270 A1 Jun. 8, 2023

Related U.S. Application Data

(63) Continuation of application No. PCT/JP2020/042093, filed on Nov. 11, 2020.

(30) Foreign Application Priority Data

Aug. 31, 2020 (JP) .................................. 2020-146138

(51) Int. Cl.
*E04F 13/00* (2006.01)
*C09D 5/00* (2006.01)
(Continued)

(52) U.S. Cl.
CPC ............ *E04F 13/002* (2013.01); *C09D 5/002* (2013.01); *C09D 5/14* (2013.01); *C09D 7/45* (2018.01);
(Continued)

(58) Field of Classification Search
CPC ........... E04F 13/002; C09D 7/61; C09D 7/45; C09D 5/002; C09D 127/12; C09D 5/14; C09D 175/04; C09D 183/04
See application file for complete search history.

(56) References Cited

U.S. PATENT DOCUMENTS

| | | | |
|---|---|---|---|
| 2003/0161959 A1 | 8/2003 | Kodas et al. | |
| 2008/0226584 A1 | 9/2008 | Krishnan | |

(Continued)

FOREIGN PATENT DOCUMENTS

| | | | |
|---|---|---|---|
| CN | 108541264 A | 9/2018 | |
| CN | 111303787 A | 6/2020 | |

(Continued)

OTHER PUBLICATIONS

Office Action issued in corresponding Japanese Patent Application No. 2020-146138, dated Feb. 2, 2021.

(Continued)

*Primary Examiner* — Theodore V Adamos
(74) *Attorney, Agent, or Firm* — Foley & Lardner LLP (57) ABSTRACT

A decorative sheet is provided that includes a paper substrate, a printed pattern layer arranged to face a major surface of the paper substrate, and a single-layer or multi-layered surface protective layer arranged to face the pattern layer, the surface protective layer comprising a coating layer as an outermost layer of the decorative sheet, the coating layer being comprised of a coating containing antiviral additive particles (e.g., antiviral agent), the antiviral additive particles comprising finely divided silver. Further, the coating layer may contain a silicone-based component or a fluorine-based component, which imparts contamination resistance to the coating layer; the amount of the antiviral additive particles in the coating layer may be 0.2 mass % or more and 12 mass % or less relative to the total solid content (Continued)

of the coating layer; and the thickness of the coating layer may be 3 μm or more.

11 Claims, 1 Drawing Sheet

(51) Int. Cl.
    *C09D 5/14*     (2006.01)
    *C09D 7/45*     (2018.01)
    *C09D 7/61*     (2018.01)
    *C09D 127/12*     (2006.01)
    *C09D 175/04*     (2006.01)
    *C09D 183/04*     (2006.01)

(52) U.S. Cl.
    CPC ............. *C09D 7/61* (2018.01); *C09D 127/12* (2013.01); *C09D 175/04* (2013.01); *C09D 183/04* (2013.01)

(56) References Cited

U.S. PATENT DOCUMENTS

| | | | | |
|---|---|---|---|---|
| 2017/0297307 | A1* | 10/2017 | Shinmyo | .................... B32B 3/30 |
| 2018/0086921 | A1 | 3/2018 | Grigorenko et al. | |
| 2020/0148899 | A1* | 5/2020 | Lim | ....................... C03C 17/008 |
| 2023/0158770 | A1* | 5/2023 | Tominaga | ............... B32B 21/02 |
| | | | | 428/172 |

FOREIGN PATENT DOCUMENTS

| | | | | | |
|---|---|---|---|---|---|
| EP | 3098071 | A1 | * | 11/2016 | ............. B32B 19/02 |
| JP | 10-315423 | A | | 12/1998 | |
| JP | 11-277685 | A | | 10/1999 | |
| JP | 2015-080887 | A | | 4/2015 | |
| JP | 2017-088509 | A | | 5/2017 | |
| JP | 2017-177802 | A | | 10/2017 | |
| JP | 2018027694 | A | * | 2/2018 | |
| JP | 2020-040267 | A | | 3/2020 | |
| KR | 20130081244 | A | * | 7/2013 | |
| TW | 200731993 | A | | 9/2007 | |
| WO | WO-2007/099738 | A1 | | 9/2007 | |
| WO | WO-2021230386 | A2 | * | 11/2021 | ............. B32B 27/08 |

OTHER PUBLICATIONS

International Searching Authority, "International Search Report," issued in connection with International Patent Application No. PCT/JP2020/042093, dated Jan. 12, 2021.
International Searching Authority, "Written Opinion," issued in connection with International Patent Application No. PCT/JP2020/042093, dated Jan. 12, 2021.
European Extended Search Report issued in corresponding European Patent Application No. 20951602.0 dated Dec. 20, 2023 (7 pages).
Office Action issued in corresponding Chinese Patent Application No. 202080103965.7 dated Mar. 29, 2025.
Office Action issued in corresponding Taiwanese Patent Application No. 110132008 dated Mar. 25, 2025.

* cited by examiner

FIG.1

FIG.2

DECORATIVE SHEET, DECORATIVE MATERIAL INCLUDING THE SAME, AND METHOD FOR PRODUCING DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/042093, filed on Nov. 11, 2020, which in turn claims the benefit of JP 2020-146138, filed Aug. 31, 2020, the disclosures of all which are incorporated herein by reference in its entirety.

TECHNICAL FIELD

The present invention relates to decorative sheets used, for example, for decorative materials, such as general fittings, and to decorative materials including the decorative sheets, and methods for producing decorative sheets.

BACKGROUND

Conventionally, antiviral "interior finishing decorative sheets" are known that contain a silver-based inorganic additive or a zinc-based inorganic additive in a resin coating at the outermost surface thereof (see paragraph [0018] and FIG. 1 of PTL 1).

The conventional silver-based inorganic additive or zinc-based inorganic additive has a true specific gravity of 2.5 or less and an average particle diameter of 1 μm or less, and is contained in the resin coating at a solid content ratio of 10 to 30%.

CITATION LIST

[Patent Literature] PTL 1: JP 2015-080887 A.

SUMMARY OF THE INVENTION

Technical Problem

The conventional "interior finishing decorative sheets" have the problem of poor antiviral properties because their antiviral properties are imparted only by a silver-based inorganic additive or a zinc-based inorganic additive contained therein.

The present invention has been made focusing on the above point, to improve antiviral properties by using finely divided silver for an antiviral additive.

Solution to Problem

A decorative sheet according to an aspect of the present invention includes:
a paper substrate;
a printed pattern layer arranged to face a major surface of the paper substrate; and
a single-layer or multilayered surface protective layer arranged to face the pattern layer, the surface protective layer comprising a coating layer as an outermost layer of the decorative sheet, the coating layer having a predetermined thickness,
the coating layer being comprised of a coating containing antiviral additive particles having a predetermined average particle diameter, the antiviral additive particles comprising finely divided silver.

Further, the decorative sheet according to an aspect of the present invention is characterized in that:
the coating layer contains a silicone-based component or a fluorine-based component,
the silicone-based component or the fluorine-based component imparting contamination resistance to the coating layer.

The decorative sheet according to an aspect of the present invention is characterized in that:
an amount of the antiviral additive particles in the coating layer is 0.2 mass % or more and 12 mass % or less relative to a total solid content of the coating layer.

The decorative sheet according to an aspect of the present invention is characterized in that:
the predetermined thickness of the coating layer is 3 μm or more.

The decorative sheet according to an aspect of the present invention is characterized in that:
the predetermined average particle diameter of the antiviral additive particles and the predetermined thickness of the coating layer satisfy the following expression:

$$0.5D \leq \varphi \leq 2D$$

where $\varphi$ is the predetermined average particle diameter of the antiviral additive particles, and $D$ is the predetermined thickness of the coating layer.

The decorative sheet according to an aspect of the present invention is characterized in that:
the predetermined average particle diameter of the antiviral additive particles is within a range of 1 to 10 μm.

The decorative sheet according to an aspect of the present invention is characterized in that:
the antiviral additive particles have a predetermined particle size distribution with one peak at a particle diameter of less than 5 μm and at least one other peak at a particle diameter of 5 μm or more.

The decorative sheet according to an aspect of the present invention is characterized in that:
the antiviral additive particles comprise the finely divided silver as an active ingredient,
the antiviral additive particles comprising an inorganic material,
the antiviral additive particles having the active ingredient supported on the inorganic material.

The decorative sheet according to an aspect of the present invention is characterized in that:
the surface protective layer further contains a surfactant.

The decorative sheet according to an aspect of the present invention is characterized in that:
the surfactant is composed of one or more types of surfactants, the one or more types of surfactants being selected from cationic, amphoteric, and nonionic surfactants.

A decorative material according to an aspect of the present invention includes:
a building material; and
the above decorative sheet,
the decorative sheet being attached to a surface of the building material.

A method is provided according to an aspect of the present invention for producing a decorative sheet that includes a paper substrate, a printed pattern layer arranged to face a major surface of the paper substrate, and a surface protective layer arranged to face the pattern layer, the surface protective layer comprising a coating layer as an outermost layer of the decorative sheet, the method comprising:

preparing first antiviral additive particles having a first predetermined average particle diameter, the first antiviral additive particles comprising finely divided silver;

preparing second antiviral additive particles having a second predetermined average particle diameter different from the first predetermined average particle diameter, the second antiviral additive particles comprising finely divided silver, the second antiviral additive particles being prepared by:

finely dividing antiviral additive particles prepared as the first antiviral additive particles, and extracting the second antiviral additive particles from the finely divided antiviral additive particles; or passing antiviral additive particles prepared as the first antiviral additive particles through a mesh sieve having an opening size different from the first predetermined average diameter to thereby extract the second antiviral additive particles therefrom; and applying a coating material of the coating layer, the coating material containing a mixture of a predetermined amount of the prepared first antiviral additive particles and a predetermined amount of the prepared second antiviral additive particles.

According to the aspects of the present invention, using finely divided silver for an antiviral additive improves antiviral properties.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

Decorative Sheet 10 According to First Embodiment

Figure 1:
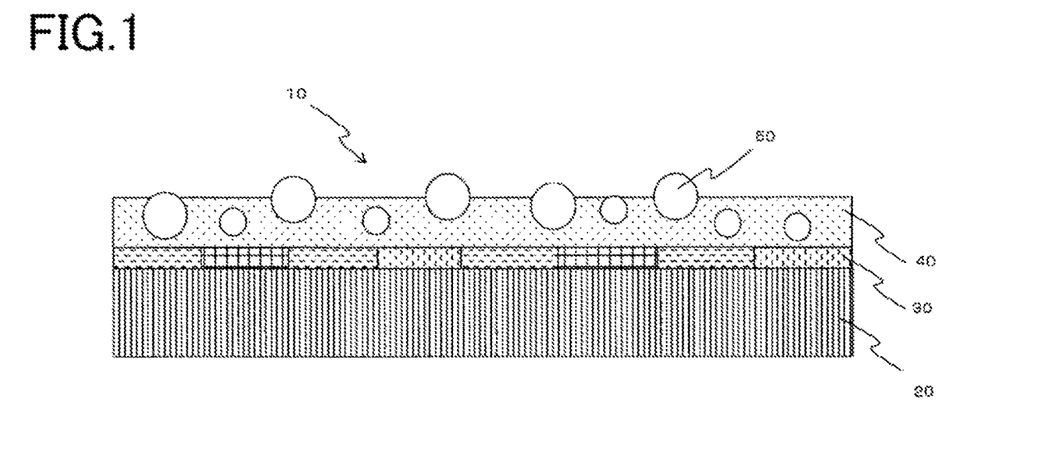
FIG. 1 is a cross-sectional view of a decorative sheet according to a first embodiment.

In FIG. 1, the reference number 10 represents a decorative sheet according to a first embodiment. The decorative sheet 10 may be used, for example, for general fittings.

The decorative sheet 10 is composed of the following layers laminated in sequence.

Each of these layers will be described later.

(1) . . . Paper substrate 20
(2) . . . Pattern layer 30
(3) . . . Surface protective layer 40
(4) . . . Antiviral agent 50

The decorative sheet 10 is not limited to the above layers (1) to (4). Although not illustrated, the surface of the surface protective layer 40, for example, may have an uneven shape formed such as by embossing so as to match the pattern layer 30, or a transparent thermoplastic resin layer may be provided between the pattern layer 30 and the surface protective layer 40.

[Paper Substrate 20]

The paper substrate 20 serves as the base of the decorative sheet 10 of the present invention, and examples thereof include various types of paper, such as thin paper, titanium paper, resin-impregnated paper, resin-mixed paper, reinforced paper, bleached or unbleached kraft paper, linter paper, high-quality paper, coated paper, inorganic paper, flame-resistant paper, paperboard, and traditional Japanese paper.

Further, the paper substrate 20 may be composed of a material other than the above types of paper, as long as it has properties similar to paper. Examples of such a material include woven or nonwoven fabrics and the like. The thickness of the paper substrate 20 is desirably selected from a range where the paper substrate 1 has proper strength and flexibility, from the viewpoint of suitability for attachment to a substrate for a decorative material; normally, a basis weight of 15 to 100 g/m$^2$ is preferable.

[Pattern Layer 30]

The pattern layer 30 is formed on the surface of the paper substrate 20 using a printing method. The pattern layer 30 is provided to impart designability to a target decorative sheet 10.

Examples of the printing method include gravure printing, offset printing, relief printing, flexographic printing, screen printing, inkjet printing, electrostatic printing, and the like. The printing method is not limited to the above example methods, and may be any conventionally known image forming means, such as a hand drawing method, a marbling method, a transfer method, a photographic method, an electrophotographic method, a photosensitive resin method, a vacuum deposition method, a chemical corrosion method, a thermosensitive coloring method, or a discharge breakdown method.

The pattern layer 30 has any type of pattern according to the intended use, user's taste, or the like; a wood grain pattern, a stone pattern, an abstract pattern, and the like, for example, are typical. The type of pattern is not limited to the above examples, and may be, for example, solid printing on the entire surface.

Typical printing ink used for printing methods is made by dispersing, in a binder composed of synthetic resin or the like, a colorant, such as an organic or inorganic dye or pigment, together with a solvent or a diluent, and an appropriate additive, such as an extender pigment, a filler, a tackifier, a plasticizer, a stabilizer, a dispersant, an antifoaming agent, a leveling agent, a surfactant, or a drying agent.

While the colorant may be an inorganic pigment, such as titanium dioxide or chrome yellow, for uses that require high concealing performance, typical examples of the colorant include organic pigments that are highly transparent and produce an excellent color effect, such as disazo yellow, hansa yellow, isoindolinone, threne, lake red, brilliant carmine, quinacridone, perylene, anthraquinone, and phthalocyanine, carbon black, and the like.

Examples of the binder include acrylic resins, polyester-based resins, polyamide-based resins, styrene-based resins, vinyl-based resins, urethane-based resins, melamine-based resins, epoxy-based resins, alkyd-based resins, cellulose derivatives, shellac, rosin, modified rosin, phenolic resins, coumarone resins, ketone resins, petroleum resins, and mixtures, copolymers, or the like of two or more thereof.

[Surface Protective Layer 40]

The surface protective layer 40 is provided to impart surface physical properties, such as abrasion resistance and water resistance, to the surface of the decorative sheet 10; further, in the present invention, the surface protective layer 40 imparts antiviral properties thereto as a result of having an outermost layer of the decorative sheet 10 formed of a coating containing antiviral additive particles comprising at least finely divided silver.

Further, the surface protective layer 40 is light transmissive so as to allow a pattern of the pattern layer 30 to be viewed from its surface.

The surface protective layer 40 is comprised of a single layer or a plurality of layers.

Examples of resins used for the surface protective layer 40 include urethane-based resins, acrylic resins, aminoalkyd resins, polyester-based resins, epoxy-based resins, melamine-based resins, fluorine-based resins, cellulose derivatives, ionizing radiation-curable resins, and the like; each of these resins can be used in the present embodiment.

Specifically, the surface protective layer 40 is formed by applying, with a gravure coater, a coating liquid obtained by adding an antiviral agent 50 to isocyanate-curable "UC Clear" (available from DIC Graphics Corporation). Note that the use of a gravure coater for this application is not meant to be limiting.

The surface protective layer 40 has the following characteristics.

(1) The outermost layer of the surface protective layer 40 contains a silicone-based component or a fluorine-based component, which imparts contamination resistance to the outermost layer.

Examples of the fluorine-based resin include polyvinylidene fluoride, polytetrafluoroethylene, tetrafluoroethylene-perfluoroalkoxy vinyl ether copolymer, tetrafluoroethylene-hexafluoropropylene copolymer, polychlorotrifluoroethylene, tetrafluoroethylene-ethylene copolymer, chlorotrifluoroethylene-ethylene copolymer, polyvinyl fluoride (PVF), and the like.

(2) The coating amount of the surface protective layer 40 is 3 μm or more.

Here, the term "coating amount" is related to "application thickness" in the Examples. That is, "coating amount" is related to the surface area of the outermost layer of the surface protective layer 40, corresponds to "application thickness", and is hereinafter also referred to as "application thickness".

(3) A system obtained by adding an antiviral agent 50 (antiviral additive particles) to the surface protective layer 40, for example an "inorganic silver system", also contains a surfactant.

(4) The surfactant is composed of one or more types of surfactants, the one or more types of surfactants being selected from cationic, amphoteric, and nonionic surfactants.

[Antiviral Agent 50]

The antiviral agent 50 is an antimicrobial substance made of an inorganic silver-based compound, for example "BIOSAIDO TB-B100" (available from Taisho Technos Co., Ltd.), and is also referred to as "antiviral additive particles". Note that the antiviral agent 50 is not limited to the example antimicrobial agent and only needs to be a silver-based antiviral agent.

The antiviral agent 50 (antiviral additive particles) contains at least finely divided silver.

The antiviral agent 50 (antiviral additive particles) has the following characteristics.

(1) The antiviral additive particles (antiviral agent 50) are contained in the surface protective layer 40 so as to be 0.2 mass % or more and 12 mass % or less relative to the solid content of the surface protective layer 40.

For example, the above-mentioned BIOSAIDO TB-B100 was added, as the antiviral agent 50, to above-mentioned isocyanate-curable UC Clear products such that the solid content ratio of the BIOSAIDO TB-B100 was 1, 3, 5, 7, 9, and 11 wt % in the respective UC Clear products.

(2) The average particle diameter of the antiviral additive particles (antiviral agent 50) and the coating amount of the surface protective layer 40 are set so as to satisfy the following expression:

$$0.5D \leq \varphi \leq 2D$$

where $\varphi$ is the average particle diameter of the antiviral additive particles, and D is the coating amount of the surface protective layer 40.

(3) The antiviral additive particles (antiviral agent 50) have an average particle diameter in the range of 1 to 10 μm.

Figure 2:
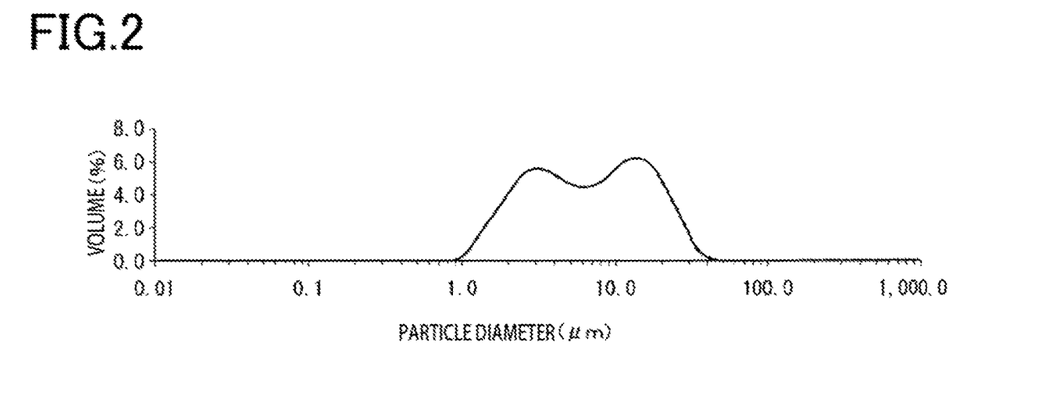
FIG. 2 is a diagram illustrating a particle size distribution of an antiviral agent.

(4) As shown in FIG. 2, the antiviral additive particles (antiviral agent 50) used have a particle size distribution with two peaks, for example, one peak at a particle diameter of less than 5 μm, the other peak at a particle diameter of 5 μm or more.

Note that having two peaks is not an inherent feature of the particle size distribution and is not meant to be limiting.

(5) An active ingredient of the antiviral additive particles (antiviral agent 50) are supported on an inorganic material.

[Production Method]

A method for producing the decorative sheet 10 is as follows:

(1) The pattern layer 30 is formed on a surface of the paper substrate 20 using a printing method.

As the pattern layer 30, a wood grain pattern layer is formed by gravure printing.

Although gravure printing is exemplified, this is not meant to be limiting, and inkjet printing may be used instead. Further, although a wood grain pattern is exemplified as a design, this is not meant to be limiting, and other patterns are possible.

(2) The surface protective layer 40 is formed on the surface of the pattern layer 30.

(3) In this step, first, different coating liquids are prepared by adding the above-mentioned BIOSAIDO TB-B100 to above-mentioned isocyanate-curable UC Clear products such that the solid content ratio of the BIOSAIDO TB-B100 was 1, 3, 5, 7, 9, and 11 wt % in the respective UC Clear products.

The antiviral additive particles (antiviral agent 50) contain at least finely divided silver.

(4) The coating liquid is applied with a gravure coater.

The coating liquid is applied at an application thickness of 5 μm. Note that the use of a gravure coater for this application is not meant to be limiting.

(5) Subsequently, aging is performed at 40° C. for 24 hours to thereby obtain a decorative sheet 10.

Alternatively, the antiviral additive particles (antiviral agent 50) may be a mixture of first antiviral additive particles and second antiviral additive particles, where the first antiviral additive particles have a first predetermined average particle diameter, and the second antiviral additive particles have a second predetermined average particle diameter different from the first predetermined average particle diameter; the second antiviral additive particles are prepared by (1) finely dividing antiviral additive particles prepared as the first antiviral additive particles, and extracting the second antiviral additive particles from the finely divided antiviral additive particles, or (2) passing antiviral additive particles prepared as the first antiviral additive particles through a mesh sieve having an opening size different from the first predetermined average particle diameter to thereby extract the second antiviral additive particles therefrom.

With this configuration, as shown in FIG. 2, the antiviral additive particles (antiviral agent 50) have a particle size distribution with at least two peaks, one peak at a particle diameter of less than 5 μm, and at least one other peak at a particle diameter of 5 μm or more.

The average particle diameter of the BIOSAIDO TB-B100 as measured with a particle size analyzer was 6.86 μm. This is the first peak of the particle size distribution.

The second peak of the particle size distribution may be the one inherent in the antiviral agent 50, or may be the artificial one.

For example, the BIOSAIDO TB-B100 was finely divided to have an average particle diameter of 0.49 μm.

Mixing the BIOSAIDO TB-B100 having an average particle diameter of 6.86 μm and the finely divided BIOSAIDO TB-B100 having an average particle diameter of 0.49 μm in a ratio of, for example, 1:1 can artificially create the first peak due to the average particle diameter of 6.86 μm and the second peak due to the average particle diameter of 0.49 μm of the finely divided BIOSAIDO TB-B100.

Further, other than pulverization, the BIOSAIDO TB-B100 may be passed through a mesh sieve with an opening size of 10 μm, which is greater than the average particle diameter of 6.86 μm. Conversely, the BIOSAIDO TB-B100 may be passed through a mesh sieve which has an opening size less than the average particle diameter of 6.86 μm, for example an opening size of less than 5.0 μm.

[Decorative Material]

A decorative material can be obtained by attaching the decorative sheet 10 obtained using the above-described production method to a surface layer of a building material (not shown).

Advantageous Effects of Embodiment

Advantageous effects of the present embodiment are as follows:

(1) According to the present embodiment, a decorative sheet 10 is provided that includes a paper substrate 20, a printed pattern layer 30 arranged to face a major surface of the paper substrate, and a single-layer or multilayered surface protective layer 40 arranged to face the pattern layer, the surface protective layer comprising a coating layer as an outermost layer of the decorative sheet, where the coating layer is comprised of a coating containing antiviral additive particles (antiviral agent 50) comprising at least finely divided silver; thus, viruses adhered to the outermost surface of the decorative sheet 10 can be killed due to the finely divided silver components.

(2) According to the present embodiment, the outermost layer of the surface protective layer 40 contains a silicone-based component or a fluorine-based component, which imparts contamination resistance to the outermost layer, thereby preventing viruses adhered to the outermost surface of the decorative sheet 10 from remaining on the surface.

(3) According to the present embodiment, the antiviral additive particles (antiviral agent 50) are contained in the surface protective layer 40 so as to be 0.2 mass % or more and 12 mass % or less relative to the solid content of the surface protective layer 40; if the antiviral additive particles are at a concentration of less than 0.2 wt %, sufficient antiviral performance is not exhibited, and if the antiviral additive particles are at a concentration of more than 12 wt %, the mechanical strength of the surface protective layer is decreased.

The content of the antiviral additive particles (antiviral agent 50) is preferably 1 wt % to 10 wt %, and more preferably 3 wt % to 8 wt %.

If the content of the antiviral additive particles is less than 0.2 wt %, the antiviral activity value tends to be low.

If the content of the antiviral additive particles is more than 12 wt %, the resin content is low, and thus the coating layer tends to be brittle.

Specifically, in this case, the coating layer tends to be damaged or peel off, and this damage in particular has a large influence.

(4) According to the present embodiment, the coating amount of the surface protective layer 40 is 3 μm or more, resulting in an increase in the absolute amount of antiviral agent, thus allowing an antiviral effect to be exhibited.

Further, according to the present embodiment, silver ions migrate through the coating film and act on viruses; thus, silver not present in the outermost layer also contributes to antiviral properties.

(5) According to the present embodiment, the expression $0.5D \leq \varphi \leq 2D$ is satisfied, where φ is the average particle diameter of the antiviral additive particles (antiviral agent 50), and D is the coating amount of the surface protective layer 40; exposing a certain amount of the antiviral agent at the surface of the surface protective layer 40 based on the relationship between the coating amount and the average particle diameter is more likely to allow an antiviral effect to be exhibited.

(6) According to the present embodiment, the antiviral additive particles (antiviral agent 50) has an average particle diameter in the range of 1 to 10 µm, and has a particle size distribution with one peak at less than 5 µm and at least one other peak at 5 µm or more; a large average particle diameter of the antiviral additive particles is desired in order for the antiviral agent to be exposed at the surface of the surface protective layer 40, and a small average particle diameter of the antiviral additive particles and thus a large surface area thereof are desired in order for silver ions to be easily generated; the above configuration can achieve both of these effects.

(7) According to the present embodiment, the active ingredient of the antiviral additive particles (antiviral agent 50), that is, finely divided silver, is supported on, for example, an inorganic material. This configuration improves the dispersibility of the active ingredient, thus suppressing blooming over time.

That is, if finely divided silver is added alone to the "coating liquid" described later in Example 1, the finely divided silver may aggregate, and may cause blooming because of low affinity for the "coating resin" described later in Example 1. Such problems can be avoided by allowing the finely divided silver to be supported on an inorganic material.

(8) According to the present embodiment, a system obtained by adding antiviral additive particles (antiviral agent 50) to the surface protective layer 40 also contains a surfactant. The surfactant increases the dispersibility of the antiviral additive particles and thus the transparency of the surface protective layer, thereby improving the designability.

Note that, because antagonism occurs between an anionic surfactant and silver ions, other surfactant systems are desirably used.

(9) According to the present embodiment, a decorative material is obtained by attaching the decorative sheet 10 to a surface layer of a building material. This minimizes the risk of viral infections via the decorative material because viruses adhered to the outermost surface of the decorative sheet 10 are reduced by 99% or more within 24 hours.

EXAMPLES

Examples 1 to 22 of decorative sheets according to the present invention, Comparative Examples 1 to 3, and a comparative blank will be described. The present invention is limited to the following Examples 1 to 22.

Examples 1 to 6

A decorative sheet of Examples 1-6 was produced in the following manner.

A wood grain pattern layer was formed on a surface of each prepared paper substrate by gravure printing. Subsequently, different coating liquids were each prepared by adding "BIOSAIDO TB-B100" (available from Taisho Technos Co., Ltd.) to isocyanate-curable "UC Clear" (available from DIC Graphics Corporation) such that the solid content ratio of the BIOSAIDO TB-B100 was 1, 3, 5, 7, 9, and 11 wt % in the respective coating liquids. These coating liquids were then applied with a gravure coater to the respective pattern layers at an application thickness of 5 µm.

Here, although an acrylic coating material was used as the coating liquid, this is not meant to be limiting.

Subsequently, aging was performed at 40° C. for 24 hours to thereby obtain decorative sheets of Examples 1 to 6.

The solid content ratio of the BIOSAIDO TB-B100 was 1 wt % for Example 1; 3 wt % for Example 2; 5 wt % for Example 3; 7 wt % for Example 4; 9 wt % for Example 5; and 11 wt % for Example 6.

Further, an active ingredient of the antiviral additive particles, that is, an inorganic silver-based compound in the case of BIOSAIDO TB-B100, was supported on an inorganic material.

That is, finely divided silver was used for the BIOSAIDO TB-B100, and the finely divided silver was supported on an inorganic substance.

Examples 7 to 12

The decorative sheets of Examples 7 to 12 were obtained under the same conditions as for Examples 1 to 6, respectively, except that the prepared coating liquids were applied to the respective pattern layers at an application thickness of 3

The solid content ratio of the BIOSAIDO TB-B100 was 1 wt % for Example 7; 3 wt % for Example 8; 5 wt % for Example 9; 7 wt % for Example 10; 9 wt % for Example 11; and 11 wt % for Example 12.

Examples 13 to 16

The decorative sheets of Examples 13 to 16 were obtained under the same conditions as for Examples 3 to 6, respectively, except that the prepared coating liquids were applied to the respective pattern layers at an application thickness of 1 µm.

The solid content ratio of the BIOSAIDO TB-B100 was 5 wt % for Example 13; 7 wt % for Example 14; 9 wt % for Example 15; and 11 wt % for Example 16.

Example 17

The decorative sheet of Example 17 was obtained under the same conditions as for Example 9 (including the solid content ratio of 5 wt % for BIOSAIDO TB-B100), except that BIOSAIDO TB-B100 was finely divided to have an average particle diameter of 0.49 µm for use in the coating liquid.

Example 18

The decorative sheet of Example 18 was obtained under the same conditions as for Example 9 (including the solid content ratio of 5 wt % for BIOSAIDO TB-B100), except that BIOSAIDO TB-B100 was passed through a mesh sieve with an opening size of 10 µm to have an average particle diameter of 10 µm or more.

Example 19

The decorative sheet of Example 19 was obtained under the same conditions as for Example 9 (including the solid content ratio of 5 wt % for BIOSAIDO TB-B100), except that finely divided silver (not supported on an inorganic substance) was used for BIOSAIDO TB-B100.

Example 20

The decorative sheet of Example 20 was obtained under the same conditions as for Example 9 (including the solid content ratio of 5 wt % for BIOSAIDO TB-B100) using the same method as for Example 9, except that 1 part by mass of an alkyl trimethyl ammonium salt as a cationic surfactant was added as a surfactant component to 100 parts by mass of the antiviral agent.

Example 21

The decorative sheet according to Example 21 was obtained under the same conditions as for Example 9 (including the solid content ratio of 5 wt % for BIOSAIDO TB-B100) using the same method as for Example 9, except that an alkyl dimethyl amine oxide as an amphoteric surfactant was used instead of the cationic surfactant in Example 20.

Example 22

The decorative sheet of Example 22 was obtained under the same conditions as for Example 9 (including the solid content ratio of 5 wt % for BIOSAIDO TB-B100) using the same method as for Example 9, except that polyethylene glycol as a nonionic surfactant was used instead of the cationic surfactant in Example 20.

Comparative Example 1

The decorative sheet of Comparative Example 1 was obtained under the same conditions as for Example 1 (including the solid content ratio of 1 wt % for BIOSAIDO TB-B100), except that the corresponding prepared coating liquid was applied to the pattern layer at an application thickness of 1 μm as in Example 13.

Comparative Example 2

The decorative sheet of Comparative Example 2 was obtained under the same conditions as for Example 2 (including the solid content ratio of 3 wt % for BIOSAIDO TB-B100), except that the corresponding prepared coating liquid was applied to the pattern layer at an application thickness of 1 μm as in Example 13.

Comparative Example 3

The decorative sheet of Comparative Example 3 was obtained under the same conditions as for Example 9 (including the solid content ratio of 5 wt % for BIOSAIDO TB-B100) using the same method as for Example 9, except that a fatty acid salt as an anionic surfactant was used instead of the cationic surfactant in Example 20.

[Production of Comparative Blank]

As a comparative blank, a decorative sheet was produced using the same method as for Example 1, except that BIOSAIDO TB-B100 was not contained therein.

[Evaluation Method]

The evaluation method and evaluation criteria are as follows.

The decorative sheets of Examples 1 to 22 and Comparative Examples 1 to 3 were subjected to antiviral testing, and visual evaluation of surface transparency.

[Antiviral Testing Method]

The antiviral testing method was as follows:

(1) Seeding of viral culture solution on sample surface

Enveloped viruses (influenza viruses) were used for the viral culture solution.

(2) Covering with polyethylene film

A polyethylene film was used to cover the sample surface so as to provide close contact between the sample and viruses.

(3) Culturing for predetermined period of time

Contact between the viruses and the sample was maintained at 25° C. and humidity of 90% or more for a predetermined period of time.

(4) Washing away of viruses with neutralizing solution

A 10 mL neutralizing solution was added to wash away and thus collect the viruses.

(5) Preparation of ten-fold serial dilution series of washing solution (6) Preparation of host cells Cells grown in a monolayer are prepared in each well of a 6-well plate, and the medium is removed from each well.

(7) Seeding of washing solution on cells 0.1 mL of the respective dilutions of the ten-fold serial dilution series were added to different wells of the plate to be seeded on the host cells.

(8) Culturing for 1 hour

The 6-well plate was transferred to a $CO_2$ incubator where the cells in the respective wells were cultured for 1 hour at 37° C. with 5% $CO_2$ to cause the viruses to be adsorbed on the cells.

(9) Addition of cell culture agar

A cell culture agar medium was added to each of the wells.

(10) Culturing for 2 to 3 days

After the mediums solidified, the cells were cultured for 2 to 3 days at 37° C. with 5% $CO_2$.

(11) Fixation of cells

A formalin fixative solution was added to each of the wells to fix the cells.

(12) Staining of cells

After the fixative solutions and mediums were removed, the cells were stained with a methylene blue stain.

(13) Counting of number of plaques (14) Calculation of virus infectivity titer and antiviral activity value

[Method of Calculating Virus Infectivity Titer]

The method of calculating virus infectivity titer is represented by the following Equation 1:

$$V = (10 \times C \times D \times N)/A \qquad \text{[Equation 1]}$$

V: Virus infectivity titer per square meter of sample ($PFU/cm^2$)

C: Counted number of plaques

D: Dilution factor of dilution in a well from which the counted number of plaques is obtained N: Neutralizing solution amount A: Area of contact between sample and viruses (area of polyethylene film)

A calculation example is as follows:

Example 1

Counted number of plaques: 12
Well used for the plaque counting: 102-fold dilution factor $$V = (10 \times 12 \times 10^2 \times 10)/16 = 7.5 \times 10^3 \, PFU/cm^2$$

$$\log V = \log(7.5 \times 10^3) = 3.88$$

[Method of Calculating Antiviral Activity Value]

The method of calculating an antiviral activity value is represented by the following Equation 2:

Antiviral activity value=log($Vb$)−log($Vc$)   [Equation 2]

Log($Vb$): Common logarithm of virus infectivity titer per square meter of untreated sample after predetermined period of time Log($Vc$): Common logarithm of virus infectivity titer per square meter of antiviral-treated sample after predetermined period of time An antiviral activity value of 2 or more is considered as "having an antiviral effect".

[Evaluation Criteria]

Evaluation criteria are broadly divided into the following two types, namely "Evaluation 1" and "Evaluation 2".

(1) Evaluation 1

Evaluation 1 refers to a criterion for evaluating "activity value" such that an activity value of 2 or more is evaluated as "Good", whereas an activity value of less than 2 is evaluated as "Poor".

(2) Evaluation 2

Evaluation 2 refers to criteria for evaluating "surface clarity" such that "transparent" is evaluated as "Excellent"; "slightly cloudy" (in the case of cloudiness only being observed directly under a fluorescent light) is evaluated as "Fair"; and "cloudy" (in the case of cloudiness being observed even without a fluorescent light directly above) is evaluated as "Poor".

[Evaluation Results]

Table 1 below shows the evaluation results for the respective decorative sheets.

TABLE 1

| New | Application thickness (μm) | Average particle diameter (μm) | Solid content ratio (wt %) | Additive | Activity value | Evaluation 1 | Surface clarity | Evaluation 2 |
|---|---|---|---|---|---|---|---|---|
| Example 1 | 5 | 6.86 μm | 1 | — | 2.2 | Good | Slightly Cloudy | Fair |
| Example 2 | 5 | As above | 3 | — | 2.4 | Good | Slightly Cloudy | Fair |
| Example 3 | 5 | As above | 5 | — | 3.0 | Good | Slightly Cloudy | Fair |
| Example 4 | 5 | As above | 7 | — | 3.5 or more | Good | Cloudy | Poor |
| Example 5 | 5 | As above | 9 | — | 3.5 or more | Good | Cloudy | Poor |
| Example 6 | 5 | As above | 11 | — | 3.5 or more | Good | Cloudy | Poor |
| Example 7 | 3 | As above | 1 | — | 2.0 | Poor | Slightly Cloudy | Fair |
| Example 8 | 3 | As above | 3 | — | 2.3 | Good | Slightly Cloudy | Fair |
| Example 9 | 3 | As above | 5 | — | 3.0 | Good | Slightly Cloudy | Fair |
| Example 10 | 3 | As above | 7 | — | 3.5 or more | Good | Cloudy | Poor |
| Example 11 | 3 | As above | 9 | — | 3.5 or more | Good | Cloudy | Poor |
| Example 12 | 3 | As above | 11 | — | 3.5 or more | Good | Cloudy | Poor |
| Example 13 | 1 | As above | 5 | — | 2.0 | Good | Slightly Cloudy | Fair |
| Example 14 | 1 | As above | 7 | — | 2.2 | Good | Cloudy | Poor |
| Example 15 | 1 | As above | 9 | — | 2.7 | Good | Cloudy | Poor |
| Example 16 | 1 | As above | 11 | — | 3.0 | Good | Cloudy | Poor |
| Example 17 | 3 | 0.49 μm | 5 | — | 2.1 | Good | Transparent | Fair |
| Example 18 | 3 | 10 μm or more | 5 | — | 2.2 | Good | Slightly Cloudy | Fair |

TABLE 2

| New | Application thickness (μm) | Average particle diameter (μm) | Solid content ratio (wt %) | Additive | Activity value | Evaluation 1 | Surface clarity | Evaluation 2 |
|---|---|---|---|---|---|---|---|---|
| Example 19 | 3 | 6.86 μm | 5 | finely divided silver (not supported on inorganic substance) | 3.5 or more | Good | Cloudy | Poor |
| Example 20 | 3 | 6.86 μm | 5 | 1 part by mass of alkyl trimethyl ammonium salt as cationic surfactant added as surfactant component to 100 parts by mass of antiviral agent | 2.5 | Good | Transparent | Excellent |
| Example 21 | 3 | 6.86 μm | 5 | alkyl dimethyl amine oxide as amphoteric surfactant instead of cationic surfactant in Example 20 | 2.7 | Good | Transparent | Excellent |
| Example 22 | 3 | 6.86 μm | 5 | polyethylene glycol as nonionic surfactant instead of cationic surfactant in Example 20 | 2.3 | Good | Transparent | Excellent |
| Comp. Ex. 1 | 1 | As above | 1 | — | 1.0 | Poor | Slightly Cloudy | Fair |
| Comp. Ex. 2 | 1 | As above | 3 | — | 1.7 | Poor | Slightly Cloudy | Fair |
| Comp. Ex. 3 | 3 | 6.86 μm | 5 | fatty acid salt as anionic surfactant instead of cationic surfactant in Example 22 | 1.1 | Poor | Transparent | Excellent |

Comparing Examples 9, 17, and 18, Example 9, which contained the original TB-B100 having two peaks in the particle size distribution, showed an activity value of 3.

In contrast, Examples 17 and 18, designed to have one peak in the particle size distribution, showed an activity value of 2.1 and an activity value of 2.2, respectively.

These results indicate that Example 9, which was designed to have two peaks in the particle size distribution, tended to have a higher activity value than Examples 17 and 18, which were designed to have one peak in the particle size distribution, and thus was presumed to have a stronger antiviral effect.

Comparing Examples 19 to 22 and Comparative Example 3, although the added surfactant in Examples 20 to 22 and Comparative Example 3 improved the dispersibility of the antiviral agent and thus increased the transparency, they tended to show a slightly lower activity value because the antiviral agent was coated with the surfactant.

Note that the Comparative Example 3, which contained the anionic surfactant, tended to show a significantly lower activity value.

As a result of evaluating Examples 1 to 16 and Comparative Examples 1 and 2 in terms of "activity value" by comparing these examples, Examples 1 to 12, where the application thickness was 3 μm or more, were found to tend to have a higher activity value than Examples 13 to 16 and Comparative Examples 1 and 2, where the application thickness was 1 μm, and thus were presumed to have a stronger antiviral effect.

As a result of evaluating Examples and Comparative Examples in terms of "activity value", it was revealed that a higher solid content ratio tended to provide a higher activity value and thus was presumed to achieve a stronger antiviral effect.

As a result of evaluating Examples and Comparative Examples in terms of "surface clarity", the application thickness is presumed to have only a small effect on the surface clarity.

Further, as a result of evaluating Examples and Comparative Examples in terms of "surface clarity", a higher solid content ratio was presumed to tend to cause cloudiness.

As an evaluation in terms of "surface clarity", the more transparent the surface protective layer 40 is, the easier it is to see the pattern of the pattern layer 30 from the outermost side of the surface protective layer 40. However, "transparent" is not necessarily good, and "slightly cloudy" or "cloudy" may be sufficient for practical use, depending on the intended use or purpose of the decorative sheet 10.

If transparency is required for the surface protective layer 40 depending on the intended use or purpose of the decorative sheet 10, adding a surfactant as in Examples 20 to 22 improves the transparency thereof, although the activity value tends to be slightly reduced in this case.

Further, although a surfactant was added to each of Examples 20 to 22, which were obtained under the same conditions as for Example 9 (including the solid content ratio of 5 wt % for BIOSAIDO TB-B100), this is not meant to be limiting; a surfactant may be added to other Examples 1 to 8 and 10 to 12.

REFERENCE SIGNS LIST

10 . . . Decorative sheet; 20 . . . Paper substrate; 30 . . . Pattern layer; 40 . . . Surface protective layer; 50 . . . Antiviral agent.

What is claimed is:

1. A decorative sheet, comprising:

a paper substrate;

a printed pattern layer arranged to face a major surface of the paper substrate; and a single-layer or multilayered surface protective layer arranged to face the pattern layer, the surface protective layer comprising a coating layer as an outermost layer of the decorative sheet, the coating layer having a predetermined thickness, the coating layer being comprised of a coating containing antiviral additive particles having a predetermined average particle diameter, the antiviral additive particles comprising finely divided silver, wherein:

an amount of the antiviral additive particles in the coating layer is 0.2 mass % or more and 12 mass % or less relative to a total solid content of the coating layer; and the antiviral additive particles have a predetermined particle size distribution with one peak at a particle diameter of less than 5 μm and at least one other peak at a particle diameter of 5 μm or more.

2. The decorative sheet of claim 1, wherein:
the coating layer contains a silicone-based component or a fluorine-based component,
the silicone-based component or the fluorine-based component imparting contamination resistance to the coating layer.

3. The decorative sheet of claim 1, wherein:
the predetermined thickness of the coating layer is 3 μm or more.

4. The decorative sheet of claim 1, wherein:
the predetermined average particle diameter of the antiviral additive particles and the predetermined thickness of the coating layer satisfy the following expression:

$0.5D \leq \varphi \leq 2D$ where $\varphi$ is the predetermined average particle diameter of the antiviral additive particles, and D is the predetermined thickness of the coating layer.

5. The decorative sheet of claim 1, wherein:
the predetermined average particle diameter of the antiviral additive particles is within a range of 1 to 10 μm.

6. The decorative sheet of claim 1, wherein:
the antiviral additive particles comprise the finely divided silver as an active ingredient,
the antiviral additive particles comprising an inorganic material,
the antiviral additive particles having the active ingredient supported on the inorganic material.

7. The decorative sheet of claim 1, wherein:
the surface protective layer further contains a surfactant.

8. The decorative sheet of claim 7, wherein:
the surfactant is composed of one or more types of surfactants, the one or more types of surfactants being selected from cationic, amphoteric, and nonionic surfactants.

9. The decorative sheet of claim 1, wherein the amount of the antiviral additive particles in the coating layer is 1 mass % or more and 10 mass % or less relative to the total solid content of the coating layer.

10. The decorative sheet of claim 1, wherein the amount of the antiviral additive particles in the coating layer is 3 mass % or more and 8 mass % or less relative to the total solid content of the coating layer.

11. A decorative material, comprising:
a building material; and
a decorative sheet of claim 1, the decorative sheet being attached to a surface of the building material.

* * * * *